United States Patent [19]
Smith

[11] Patent Number: 6,103,046
[45] Date of Patent: Aug. 15, 2000

[54] APPARATUS FOR FORMING SEAL AND REINFORCED HOLES THROUGH THE END OF A FLEXIBLE RESIN IMPREGNABLE TUBULAR PIPELINER

[75] Inventor: Edward Peter Smith, Germantown, Tenn.

[73] Assignee: Insituform (Netherlands) B.V., Netherlands

[21] Appl. No.: 08/786,248

[22] Filed: Jan. 22, 1997

Related U.S. Application Data

[62] Division of application No. 08/497,147, Jun. 30, 1995, Pat. No. 5,919,327.

[51] Int. Cl.⁷ .......................... B29C 43/18; F16L 55/163; B32B 31/04
[52] U.S. Cl. .......................... 156/245; 156/287; 156/294; 138/98; 138/109; 264/154; 264/263
[58] Field of Search .................... 156/245, 287, 156/294, 305; 264/259, 263, 154; 138/97, 98, 106, 107, 109

[56] References Cited

U.S. PATENT DOCUMENTS

| | | | |
|---|---|---|---|
| 4,776,370 | 10/1988 | Long, Jr. .................... | 138/98 |
| 4,910,066 | 3/1990 | Foisie ........................ | 428/137 |
| 5,049,336 | 9/1991 | Sjostrom .................... | 264/154 |

*Primary Examiner*—Michael W. Ball
*Assistant Examiner*—Michael A Tolin
*Attorney, Agent, or Firm*—Cowan, Liebowitz & Latman, P.C.; Michael I. Wolfson; Lloyd G. Buchanan

[57] ABSTRACT

A method and apparatus for forming sealed and reinforced holes through the end of a flexible, resin-impregnable, tubular pipe liner for securing a cable thereto and for sealing the end of the liner. The liner is installed into an existing conduit either by pulling a cable secured to holes at the front end of the liner or by eversion of the liner while securing a hold-back cable to holes at the trailing end of the everting liner. Holes are cut through the liner, and resin is impregnated into the region about each hole and hardened to form an integral grommet or reinforcement. A mold for impregnating the region about the hole includes a lower mold body with a projecting spigot and a groove thereabout. An upper mold body has a central opening with a groove thereabout, the upper mold body fitting over the spigot. A tube fits into the central opening and receives a resin, which is then forced by a plunger down the tube and allowed to harden and form a secure and reinforced hole for attaching a pull-in or hold-back rope or cable.

8 Claims, 8 Drawing Sheets

APPARATUS FOR FORMING SEAL AND REINFORCED HOLES THROUGH THE END OF A FLEXIBLE RESIN IMPREGNABLE TUBULAR PIPELINER

CROSS-REFERENCE TO RELATED APPLICATION

This is a divisional of application Ser. No. 08/497,147, filed Jun. 30, 1995, now U.S. Pat. No. 5,919,327 issued on Jul. 9, 1999.

BACKGROUND OF THE INVENTION

The present invention relates generally to a method and apparatus for the installation of a cured in place liner within the interior of a conduit or pipeline, such as a sewer pipe, and, more particularly, to a method and apparatus for sealing the end of the liner and for securing a cable to the liner for installation.

It is generally well known that conduits or pipelines, particularly underground pipes, such as sanitary sewer pipes, storm sewer pipes, water lines and gas lines, that are employed for conducting fluids frequently require repair due to fluid leakage. The leakage may be inward, from the environment into the interior or conducting part of the pipe, or outward, from the conducting part of the pipe into the surrounding environment. Leakage of this type may be due to improper initial installation of the pipe, deterioration of the pipe itself due to normal aging or to the effects of conveying corrosive or abrasive materials, cracking of the pipe or of pipe joints due to environmental conditions such as earthquakes, the movement of large vehicles or similar natural or man made vibrations, or any other such causes. Regardless of the cause, such leakage is undesirable and may result in waste of the fluid being conveyed by the pipe, in damage to the surrounding environment and in the possible creation of dangerous public health hazards.

Because of ever increasing labor and machinery costs, it is becoming increasingly more difficult and less economical to dig up and replace underground pipes, or portions or sections of such underground pipes, that may be leaking. As a result, various methods have been devised for the in situ repair or rehabilitation of the existing pipes, thereby avoiding the expenses and hazards associated with digging up and replacing the pipes or pipe sections. One of the more successful pipe repair or rehabilitation processes that is currently used is called the Insituform® Process and is described in U.S. Pat. Nos. 4,009,063; 4,064,211; and 4,135, 958, the contents of all of which are incorporated by reference herein.

Briefly, in the Insituform Process, an elongated flexible tubular liner of a felt fabric, foam or similar resin impregnable material that has been impregnated with a thermosetting synthetic catalyzed resin is installed within the existing pipe. The impregnated liner may be pulled into the conduit by a rope or cable, and a fluid impermeable inflation bladder or tube is then everted within the liner. Generally, however, the liner is installed utilizing an inverting (or everting) process, as described in the latter two patents.

The flexible tubular liners have a smooth layer of relatively flexible, substantially impermeable material coating the outside of the liner in its initial state, which impermeable layer ends up on the inside of the liner after the liner is inverted. As the flexible liner is installed in place within the pipe, the liner is pressurized from within, preferably utilizing a fluid such as water, forcing the liner radially outwardly to engage and conform to the interior surface of the pipe. The resin is then cured to form a relatively hard, tight fitting, rigid pipe lining that effectively seals any cracks and that repairs any pipe or pipe joint deterioration in order to prevent further leakage either into or out of the pipe. The cured resin liner also serves to strengthen the existing pipe walls so as to provide added structural support for the surrounding overburden.

All of these existing liner insertion methods, especially for the installation of a liner into a large diameter pipe, require positive control of the insertion and inversion of the liner throughout the entire inversion process.

The known methods for providing the pressure necessary to invert the liner within the pipe and to push it along the length of the pipe must also involve means for controlling the feed rate of the liner, i.e., the rate at which the liner is inverted and pushed into the pipe. Generally, in the Insituform Process, the resin-impregnated liner, which is typically stored in layers, is placed at a manhole adjacent the conduit to be lined, and the leading end of the liner is sealingly clamped to the proximal inside end of an eversion tube in order to create a fluid seal. The pressurized fluid, such as water, then forces the liner to invert into the conduit. Various means have been provided for controlling the rate at which the liner inverts and is fed into the conduit. The typical means within the Insituform Process for controlling the "feed rate" of the liner is by restraining the trailing end of the resin-impregnated liner as it is everted into the conduit using a cable or a hold-back rope. By restraining the trailing uneverted end of the liner, the liner does not evert too quickly, thereby ensuring that the pressure is maintained within the liner.

In addition to being restrained, the trailing end of the liner must also be sealed so that, when the tube is fully everted, the pressurized water or other fluid within the pipe is contained. At times, these pressures can be large. For example, the hold-back force needed during eversion of a 60-inch diameter liner tube with a 30-foot head of water is in excess of 20,000 pounds. When the tube is fully everted, the end of the liner must resist double that force.

Various means have been proposed to secure a holdback rope or cable to the trailing end of the liner for restraining the trailing end of the liner and for distributing the pulling stress over the entire width of the end of the liner. It has been proposed to seal the liner at the point of attachment of the hold-back cable in order to prevent water from escaping through the uneverted end of the liner and penetrating into the resin-wet material of the uneverted and everted portions of the liner ahead. One such cable end seal is shown in U.S. Pat. No. 4,776,370, the contents of which are incorporated herein by reference.

In the process described in U.S. Pat. No. 4,776,370, a short length of cured synthetic resin film, such as "Tuftane", is bonded directly to the outside of the flattened trailing end of the liner to seal the end of the liner. A series of holes is then formed through the flattened end of the liner. Special plates or straps also having holes are spaced out along both sides of the flattened end of the liner such that those holes align with the holes through the liner. Fastening elements such as nuts and bolts are placed through the holes of both the plates and the liner in order to secure the plates to the liner and seal the end of the liner. The hold-back cable is then attached, either directly or by way of an additional connector, to the plates for regulating the feed rate of the liner.

Another prior art way of securing a cable or rope to the trailing end of the liner for sealing the end of the liner and for distributing the pulling stress over the entire width of the flattened liner end is to use a series of holes as shown in FIG. 1. In this method a liner 2 having a trailing end 4 is flattened, and a series of holes 11 is formed through liner 2. Metal grommets may optionally be placed in holes 11 as reinforcement. A cable or rope 10 is then woven through holes 11 across liner end 4, and a number of rope handles 12 are looped around cable 10 at the region where cable 10 passes through liner end 4. Handles 12 are then tied to a hold-back cable for restraining trailing end 4 of liner 2 and for controlling the rate of eversion. In both of these conventional methods, the points at which the holes are formed through the liner and at which the handles emerge from the end of the liner must all be sealed in order to prevent water or fluid leakage. The assembly of such sealed ends is time consuming, difficult and expensive, and the seals are rarely totally effective.

Accordingly, it is desirable to provide a method and apparatus for forming attachment points or holes for the holdback cable, such that these holes are fully sealed and distribute the pulling forces effectively across the width of the felt or the resin-absorbent material and such that the resulting seals withstand the pressure built up when the liner is completely inverted.

SUMMARY OF THE INVENTION

Generally speaking, in accordance with the invention, a method and apparatus are provided for forming sealed and reinforced holes through the end of a flexible resin impregnable tubular pipe liner for securing a cable thereto and for sealing the end of the liner. The liner is to be installed into an existing conduit either by pulling the liner into the conduit using a cable secured to holes at the front end of the liner or by eversion of the liner while securing a hold-back cable to holes at the trailing end of the everting liner. First, the holes are cut through the liner, and then resin is impregnated into the region about each hole and hardened to form an integral grommet or reinforcement about the hole. A mold for impregnating the region about the hole includes a lower mold body with a projecting spigot and a groove thereabout. An upper mold body has a central opening with a groove thereabout, the upper mold body fitting over the spigot but leaving room to engage a tube therebetween. A tube fits into the central opening and receives a resin within it. The resin is forced by a plunger down the tube, about the spigot and into the region surrounding the hole in the liner. After injection, the resin is allowed to harden, thereby forming a secure and reinforced hole for attaching a pull-in or hold-back rope or cable.

The liner can be folded at the end, and reinforcing disks can be placed on the outsides of the folded liner in order to distribute the pulling forces along the material. Also, a capstan can be attached to the integrally-formed grommets between the two folded sides of the liner end portion in order to allow the hold-back cable to be wrapped around it so that, when one end of the cable is fixed, the other end of the cable can be slackened to allow the liner to evert slowly within a conduit.

Accordingly, it is an object of the invention to provide an improved method for securing a hold-back, or restraining, cable to a flexible resin impregnable tubular pipe liner that is to be installed within an existing conduit.

It is another object of the invention to provide an improved integrally-formed grommet in a resin impregnable liner.

It is a further object of the invention to provide an improved seal for the end of a flexible resin impregnable liner that is to be installed within an existing conduit.

It is yet another object of the invention to provide an improved reinforced hole in a flexible resin impregnable liner for mounting reinforcement disks for sealing the end of the liner that is to be installed in an existing conduit.

It is yet a further object of the invention to provide an apparatus for forming an integral grommet about a hole in a flexible resin impregnable tubular liner.

It is still a another object of the invention to provide a method for forming an integral reinforced grommet in a hole in a flexible resin impregnable liner.

It is still a further object of the invention to provide an apparatus and method for sealing the end of a flexible resin impregnable liner that is to be installed within an existing conduit.

Still other objects and advantages of the invention will in part be obvious and will in part be apparent from the specification.

The invention accordingly comprises the several steps and the relation of one or more of such steps with respect to each of the others, the apparatus embodying features of construction, combinations and arrangement of parts which are adapted to effect such steps, and the article which possesses the characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
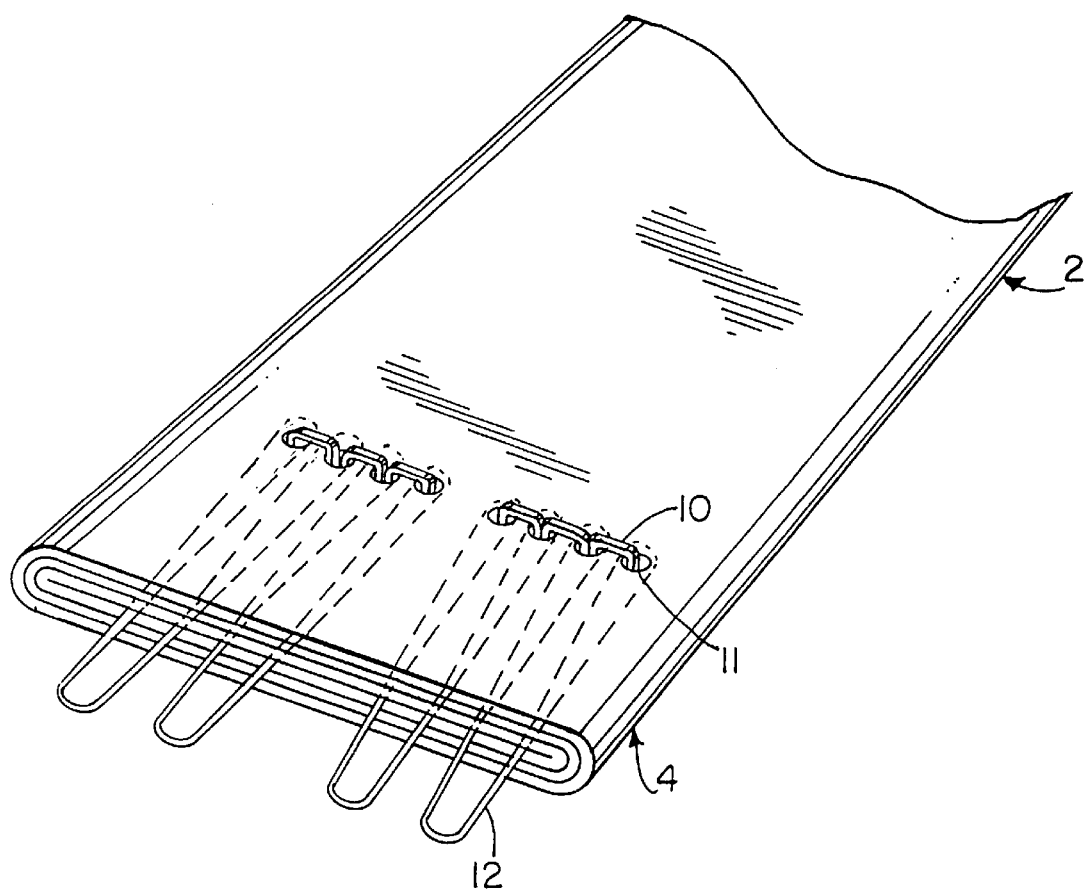
FIG. 1 is a perspective view of a prior art method for securing a hold-back or restraining cable to the trailing end of an everting cured-in-place liner.
Figure 2:
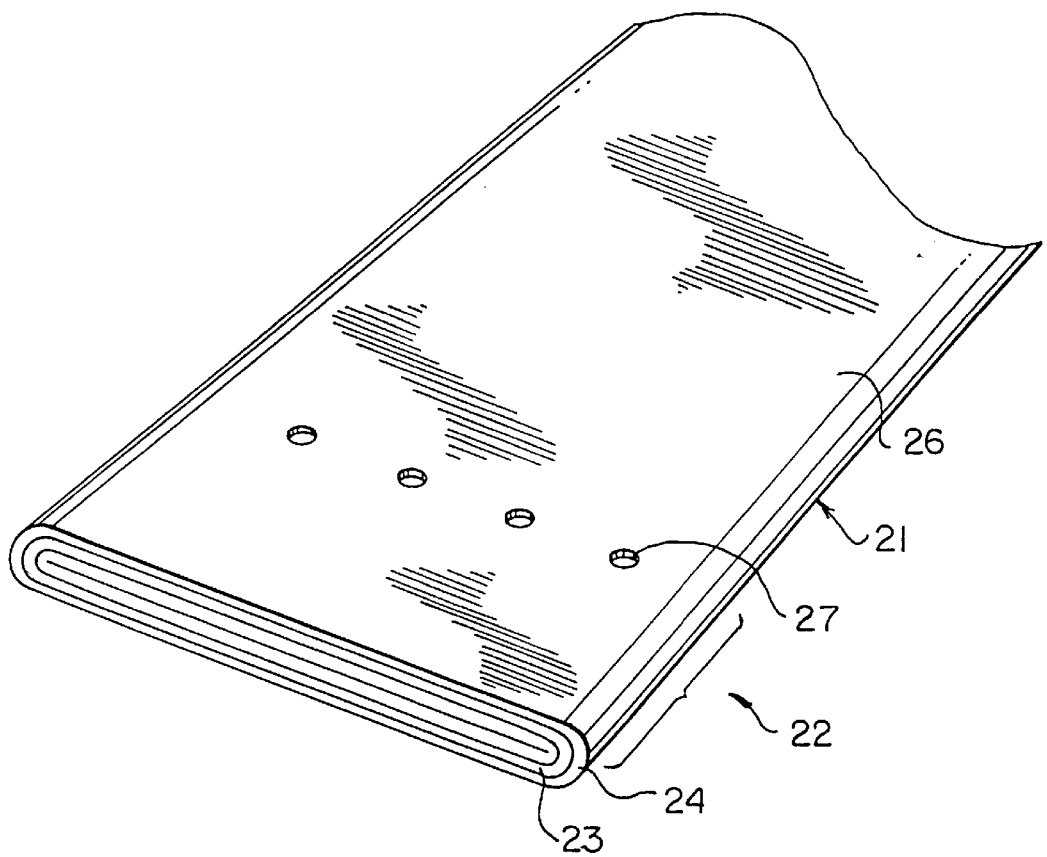
FIG. 2 is a perspective view of the trailing end of a flattened resin impregnable liner with several holes formed in accordance with an initial step in the invention.

FIG. 2 depicts a tubular liner 21 having a trailing end 22 and formed from several layers of felt 23. An outermost flat layer 24 has a flexible impermeable coating 26 on the outside thereof. As shown in FIG. 2, liner 21 is collapsed, and end portion 22 is flattened. One or more holes 27 are drilled through all the layers of felt 23 and coating 26 with a suitable hole saw. The number of holes 27 that are formed depends upon the diameter of liner 21. For a liner with a diameter of less than ten inches, one hole is sufficient. For a liners with a very large diameter, i.e., sixty inches or more, there may be a need for eight or more holes.

Figure 3:
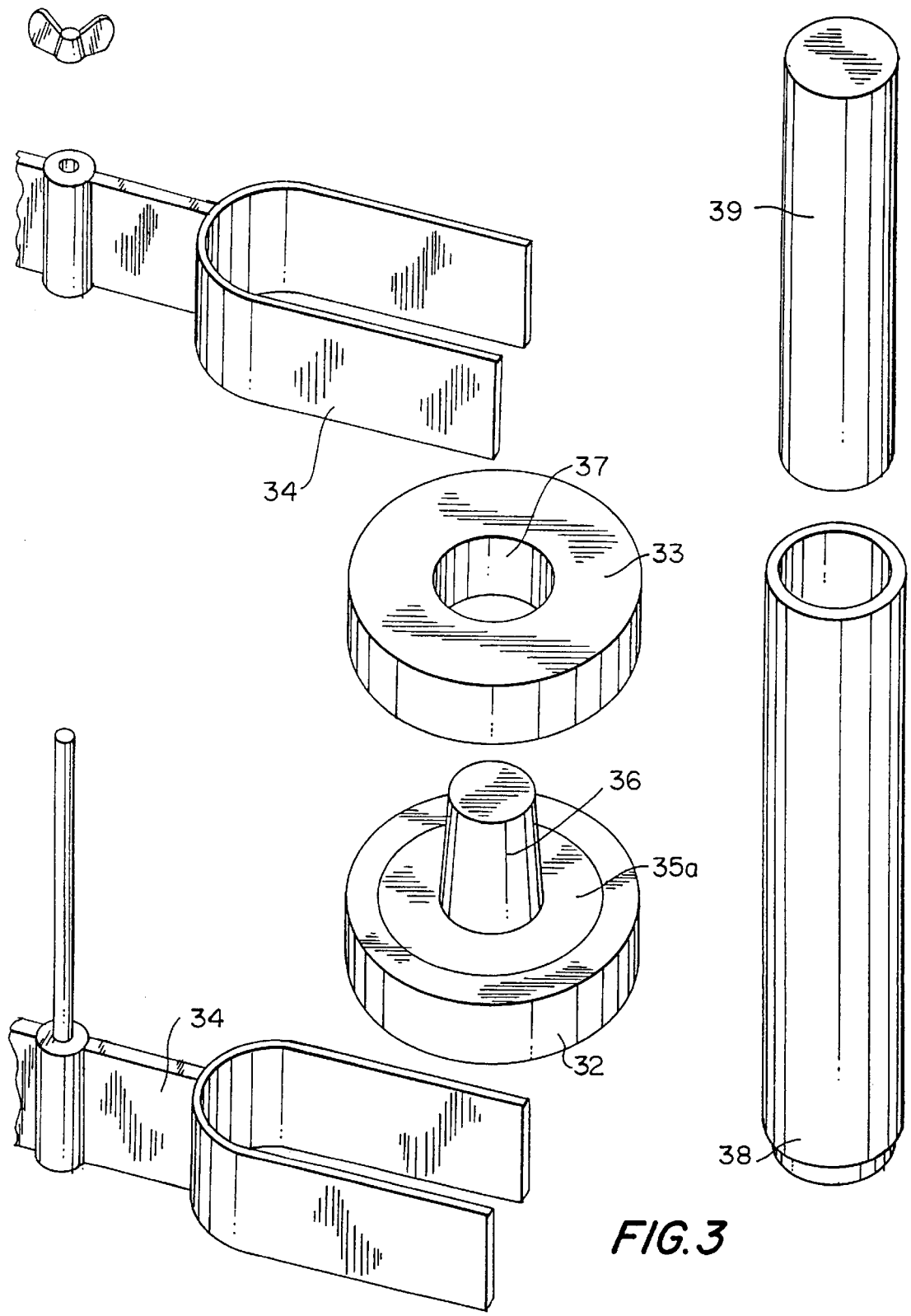
FIG. 3 is an exploded perspective view of a mold arrangement for integrally forming grommets in the resin impregnable liner in accordance with the invention.

FIG. 3 depicts a mold arrangement 31 in which a lower half 32 and a top half 33 are arranged inside a clamping means 34. The mold halves are conveniently circular, but it will be understood that other shapes may be used. The mold halves are made of a suitable material, such as polypropylene, that will not stick to the thermosetting resin or other type of resin that is to be cast within the mold. Lower half 32 of mold 31 has a central spigot 36 that is frusto-conical in shape with a slight taper towards the top to ease its removal from the cast insert of thermosetting resin. Spigot 36 cooperates with a central hole 37 formed in top half 33 of mold 31, through which hole resin may be introduced.

Figure 4:
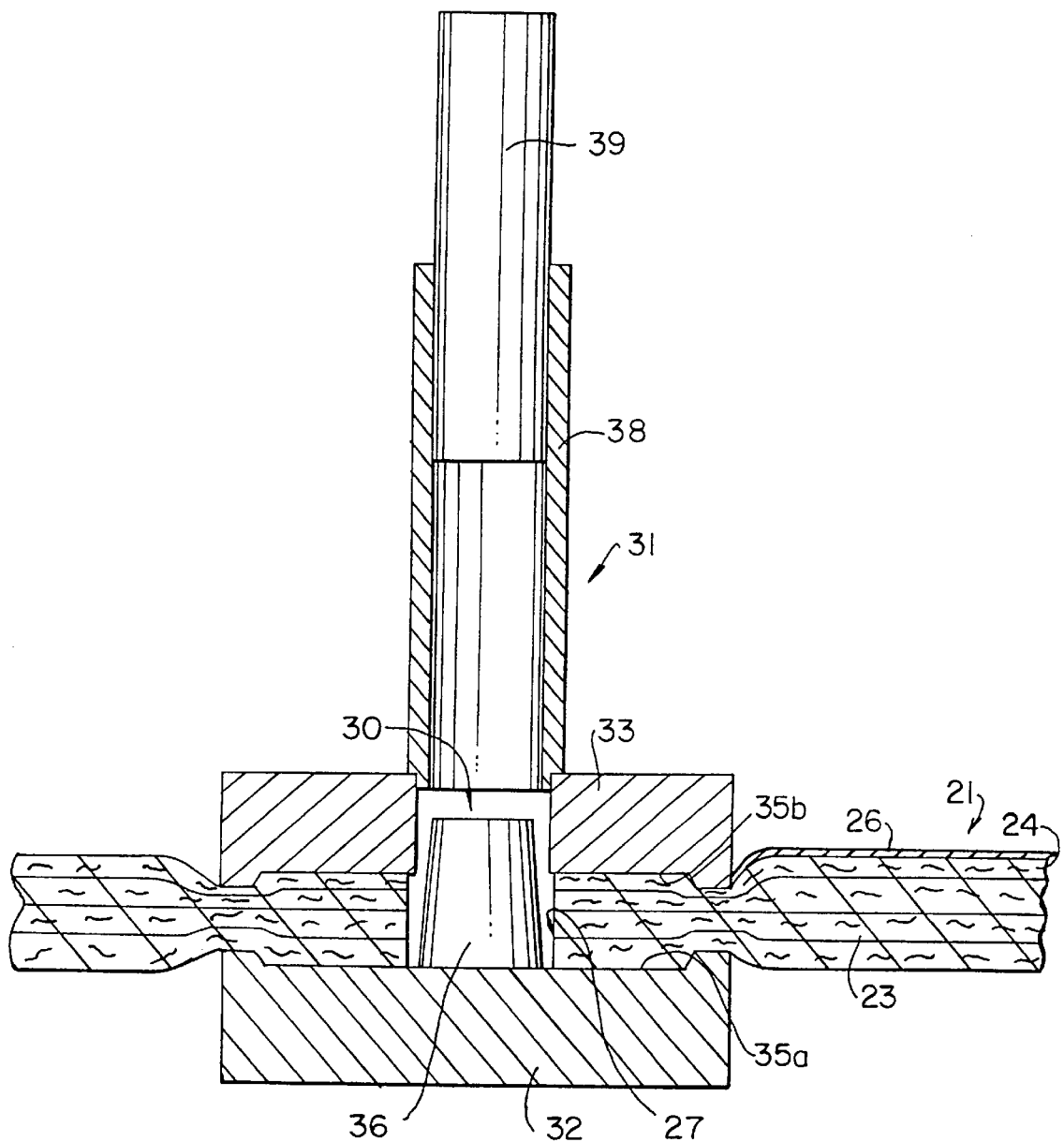
FIG. 4 is a sectional view of the mold arrangement of this invention positioned through a hole formed in an end of a resin impregnable liner.

A filler tube 38 is provided to mate with hole 37 in top half 33 of mold 31 and form a sliding fit with a plunger 39. Conveniently, filler tube 38 and plunger 39 are also made of polypropylene or other material that will not stick to the resin. As shown in FIGS. 3 and 4, the upper surface of lower half 32 is formed with an annular groove 35a about spigot 36. Similarly, top half 33 is formed with an opposing annular groove 35b that, together with groove 35a, forms a pocket or mold to allow resin be injected into the region about the hole and cure into a self-forming seal or grommet in accordance with the invention.

FIG. 4 shows a sectional view of mold 31 positioned through hole 27 cut through felt layers 23 of liner 21. When mold 31 is positioned in hole 27, bottom half 32 of mold 31 is placed under liner 23 such that central spigot 36 is placed through hole 27. Top half 33 of mold 31 is then placed on the opposite side of liner 23 so that central hole 37 cooperates matingly with spigot 36. Top and bottom halves 33, 32 of mold 31 are then clamped together using clamping means 34 such that the portions of felt layers 23 and coating 26 immediately adjacent to hole 27 are trapped within the pocket formed between opposing annular grooves 35a, 35b and are held there by the opposing outer edges of top and bottom halves 33, 32 of mold 31.

The integrally-formed grommets or reinforced holes in liner 21 are formed by mixing a liquid resin and hardener, which mixture is designed to harden at room temperature within a reasonably short time after mixing. The resin system may be any commercially available liquid resin systems, such as unsaturated polyester, epoxy or polyurethane. After the resin has been mixed, a measured quantity 30 is poured into filler tube 38 and is then forced into the pocket formed between opposing grooves 35a, 35b and into felt 23 trapped therein by pushing plunger 39 down into tube 38. It has been found that this displaces air in felt 23 by moving the air radially from the center edges of hole 27. When the resin is hard, mold 31 is removed, leaving the felt layers locked together and sealed to the impermeable coating 26 with an integrally-formed grommet 40. By using several molds at the same time, all the holes 27 can be so sealed and reinforced with integrally-formed grommets more or less simultaneously. Alternatively, one mold may also be used to sequentially seal and reinforce each hole 27 in turn by integrally forming a grommet within each one.

Figure 5:
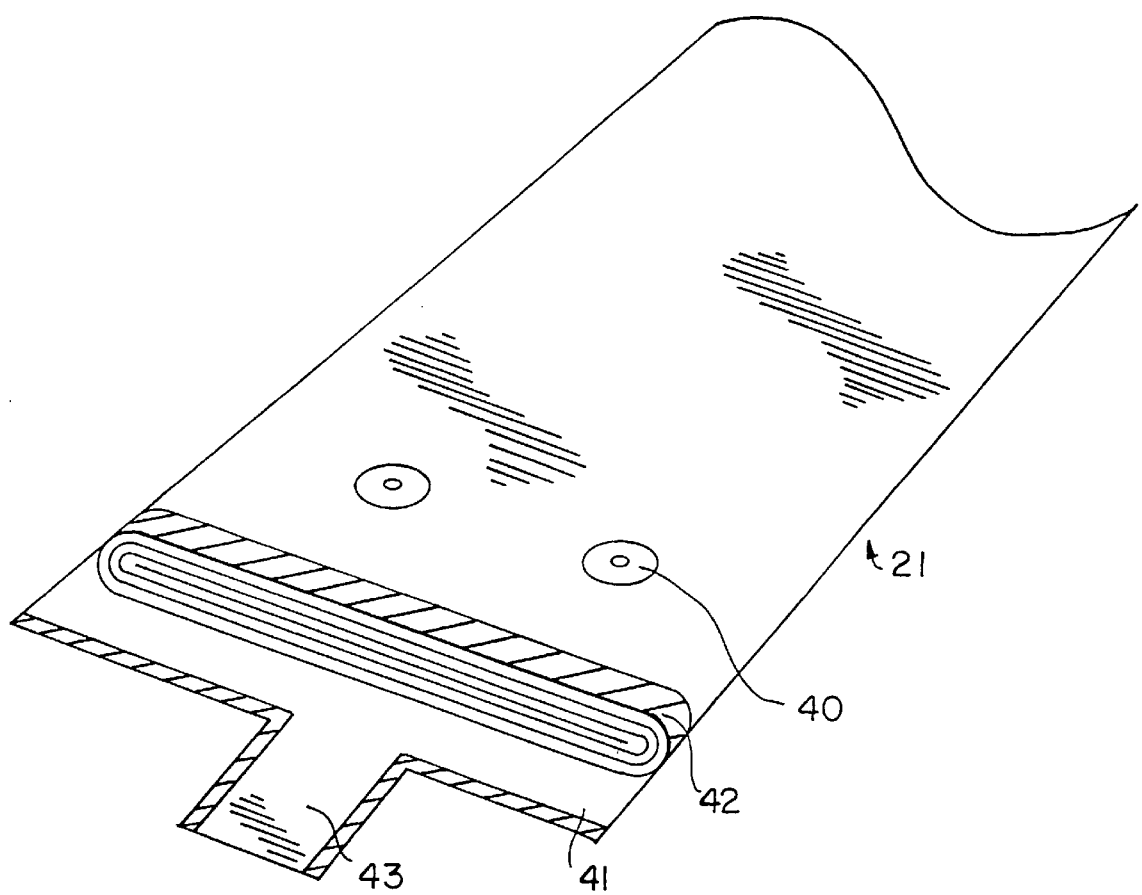
FIG. 5 is a perspective view of the flattened end of the liner of FIG. 4 with a welded-film end seal.

After integrally-formed grommets 40 have been provided in all the holes 27, end 22 of flattened liner 21 is provided with a seal by welding a film 41 around the end of liner 21, as shown in FIG. 5, in which the welds are shown by cross-hatching 42. The film is made of the same material as the impermeable coating. The weld 42 may be accomplished by heat or solvent welding, depending on the particular coating material. It is found convenient to seal the edge of the film leaving an extension flap 43 for injecting into liner 21 the resin with which the felt is to be impregnated.

Figure 6:
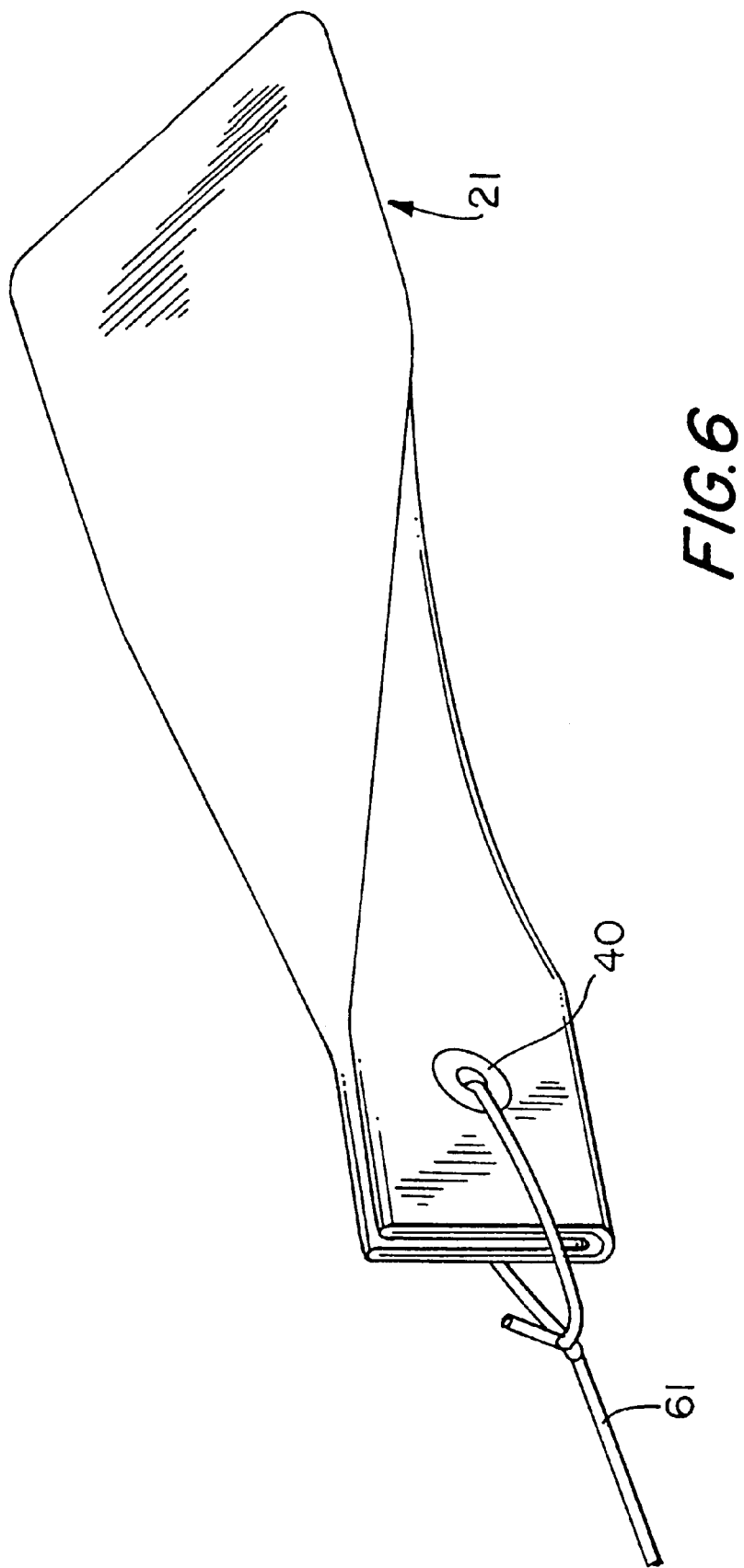
FIG. 6 is a perspective view showing the use of the integrally-formed grommet for securing a hold-back cable to the trailing end of the liner.

Liner 21 is then fully impregnated with resin and is then ready to be inserted into the conduit that is to be lined. The liner may optionally be impregnated with resin after transport to the job site. A rope and a layflat hose are then attached to the end of liner 21 to control the rate of eversion and to transport the layflat hose to the far end of the pipeline so that hot water may be pumped to the end in order to effect hardening of the resin throughout the pipeline. FIG. 6 shows an arrangement wherein a rope 61 is passed through integrally-formed grommets 40 in end 22 of liner 21. This arrangement is satisfactory for a liner with a smaller diameter because the molded holes will distribute the load on the holdback rope 61 into the felt layers during eversion and will be strong enough to hold the end of the liner closed when the eversion is complete, as shown in sectional view in FIG. 7.

Figure 7:
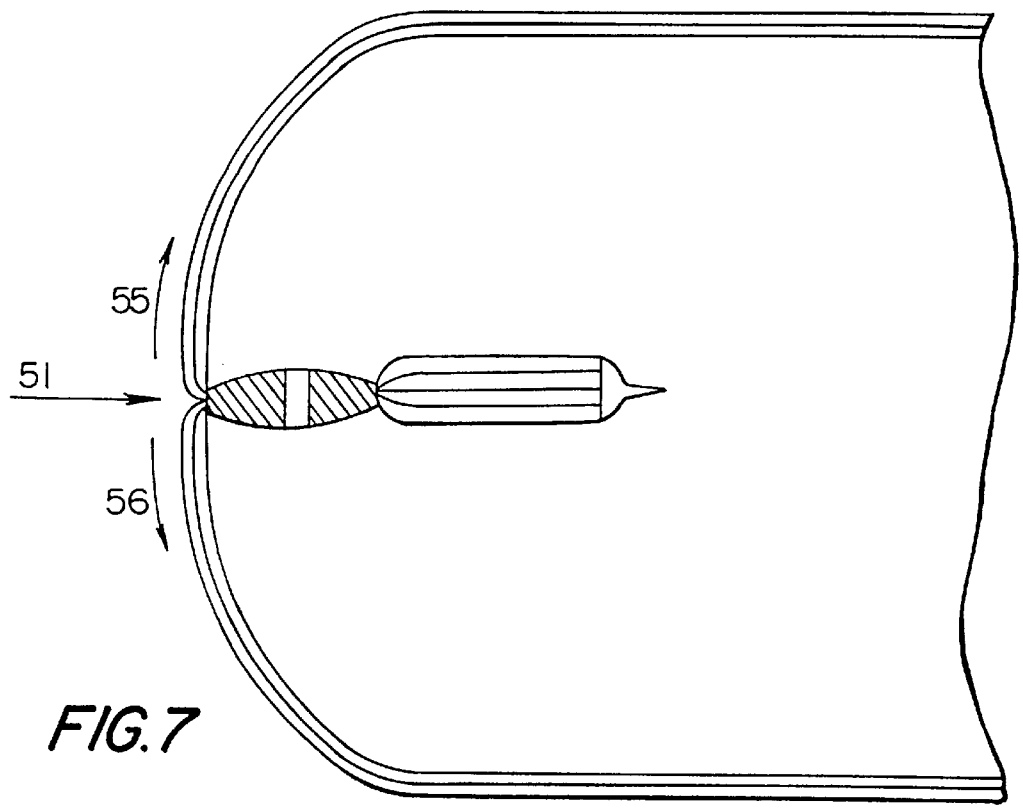
FIG. 7 is a cross-sectional view of the end of a fully everted resin impregnated liner showing the sealed end in accordance with the invention.
Figure 8:
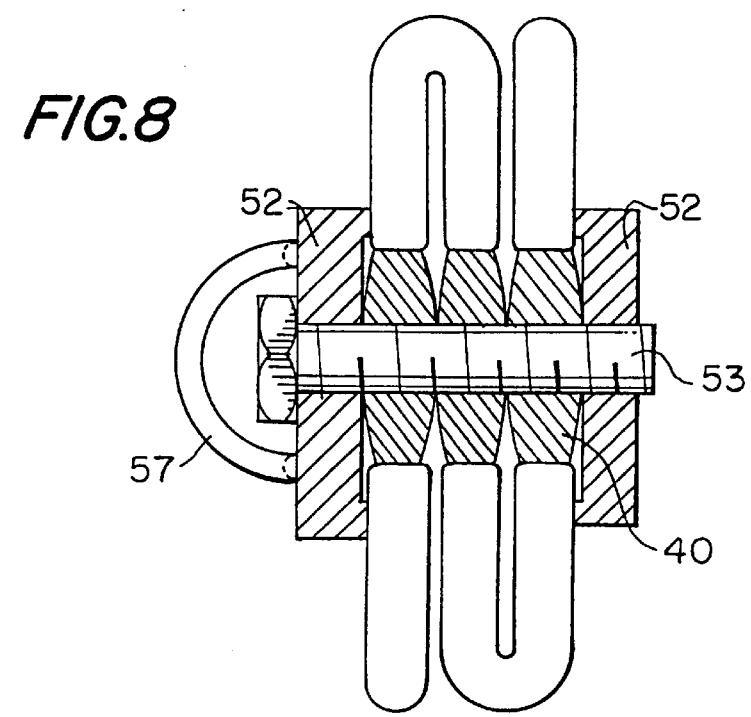
FIG. 8 is a cross-sectional view of the sealed end of a liner with reinforcing disks in place.

For a liner of larger diameter, however, the force applied to holes 27 and integrally-formed grommets 40 may be so great as to split the resin and felt molding at position 51, shown in FIG. 7. For such liners, shown triple-folded in FIG. 8, a metal reinforcing disk 52 may be secured on the outside of the liner by a bolt 53 passing through integrally-formed grommets 40. Each disk 52 has a diameter that is appreciably greater than the diameter of grommets 40 so that the loads imposed by the felt resisting the water pressure are taken in the plane of reinforcing disks 52 rather than at right angles to the disks, as shown by arrows 55 and 56 in FIG. 7. When such reinforcing disks 52 are used, one or both are equipped with a suitable attachment point 57 to which the hold-back rope may be tied.

Figure 9:
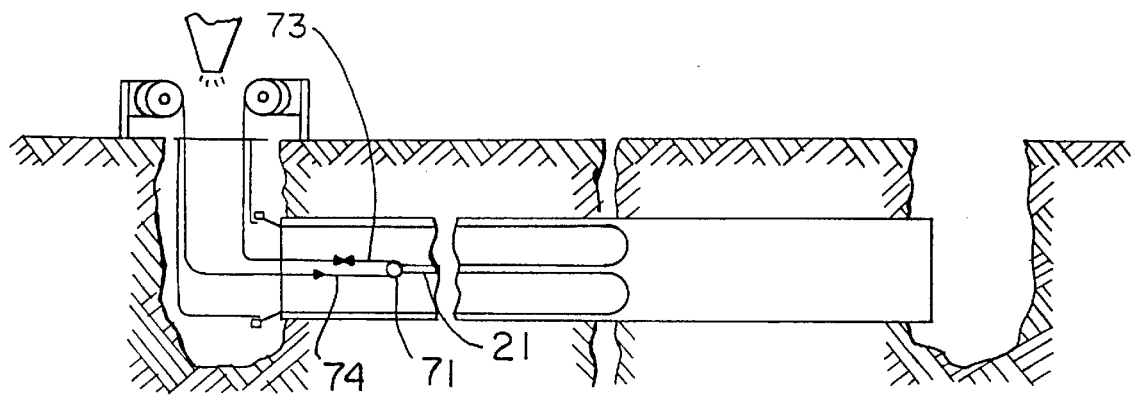
FIG. 9 is a cross-sectional elevational view showing a cured-in-place liner being everted into an underground conduit using a capstan, as described in an embodiment of the invention.
Figure 10:
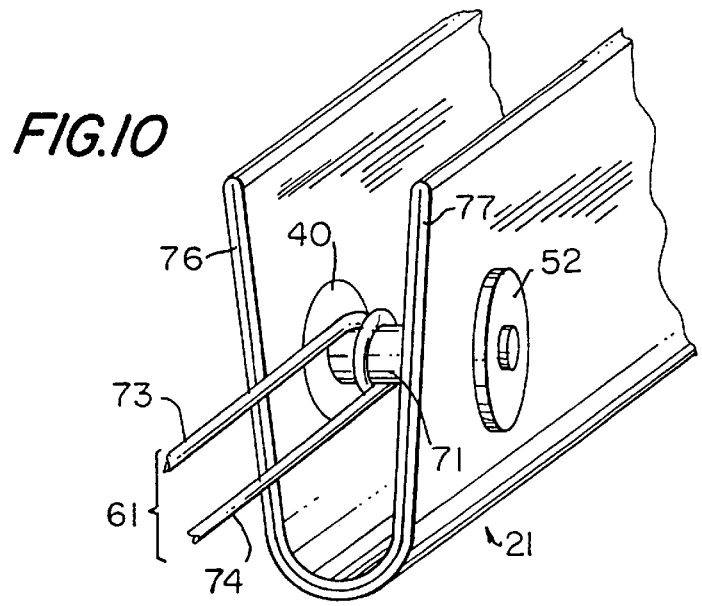
FIG. 10 is a perspective view showing the use of a capstan and the integrally-formed grommet for securing a holdback cable to the trailing end of the liner.

The use of hold-back rope 61 with the integrally-formed grommets 40 of this invention can sometimes lead to a situation in which, if the lining tube must follow a somewhat curved path due to the conduit being other than straight, holdback rope 61 comes to bear against the everted resin-impregnated liner portion and against the impermeable layer on the inside of the everted liner. Due to the tension in holdback rope 61, the motion of rope 61 as it is being slowly released may create friction between the rope and the liner, causing the liner to rub or burn away, resulting in an undesirable hole within the lining. This situation can be ameliorated, as shown in FIGS. 9 and 10, by attaching a capstan or a pulley 71 to the trailing end 21 of the liner so as to define two reaches 73,74 of hold-back rope 61 extending from the capstan 71 to a location when the ends of the rope can be held. When one of the hold-back rope reaches 73 is fixed, the other reach 74 is slackened and is allowed to be fed and slide around the capstan 71 as the eversion proceeds. Thus, the fixed reach 73 will carry the higher tension and will perform the main hold-back function but does not move relative to the liner already everted. The second reach 74, which is fed, will carry much less tension and controls the rate of eversion. In this arrangement, only the second reach 74 will be allowed to move relative to the inner surface of the liner, and friction is reduced.

Because the difference in tension between the two reaches 73,74 of hold-back rope 61 depends upon a number of factors, including the coefficient of friction of the capstan 71 surface, the angle of wrap of the hold-back rope 61 around the capstan 71 and the number of wraps of the hold-back rope 61 around the capstan 71. Thus, the hold-back rope 61 may wrap around the capstan for only part of a time but should preferably wrap around the capstan 71 at least once in order to increase the frictional sliding resistance between the rope 61 and the capstan 71.

As shown in FIG. 10, the capstan 71 should preferably be placed between the two sides 76,77 of the flattened and folded liner end portion 21 so that pulling forces from the hold-back rope are evenly distributed between the two sides 76,77 of the flattened and folded liner end portion 21. In addition, metal reinforcing disks 52 may be secured on the outside of the liner, using the same bolt that passes through the integrally-formed grommets 40 and holds the capstan 71, to further distribute the pulling forces.

It will be appreciated that the size and number of reinforcing disks 52 or integrally-formed grommets 40 will be selected for the thickness and diameter of the felt liner being used and for the number of holes 27 formed therein. Typically, the resin reinforcement of the integrally-formed grommets 40 will have an outer diameter in the range of three to six inches, and the holes 27 themselves will have an inner diameter in the range of 0.75 inches to 1.5 inches. As described above, the holes 27 are formed by spigot 36 of mold 31 but could equally be formed by drilling after molding. In the description above, the integrally-formed grommets 40 are formed from a liquid resin that hardens by a chemical reaction, but it will be appreciated that they could be formed by injection of a molten plastic which hardens as it cools.

It will thus be seen that the objects set forth above, among those made apparent from the preceding description, are efficiently attained and, since certain changes may be made in carrying out the above process, in the described product, and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of installing a flexible resin impregnable tubular liner having a fluid impermeable outer coating on a resin impregnable material into an existing conduit, comprising:

flattening one end of the liner;

forming at least one opening through the flattened liner;

impregnating a resin into the region of the resin impregnable material about the at least one opening;

hardening the resin to bond the layers of the resin impregnable material of the flattened liner together;

attaching a securing member to the liner through the hardened resin;

impregnating the tubular liner;

inserting the liner into an existing conduit; and curing the liner in place.

2. The method of claim 1, wherein the liner is inserted by pulling into the existing conduit.

3. The method of claim 1, wherein the liner is inserted by everting into the existing conduit.

4. The method of claim 1, wherein said step of attaching a securing member comprises tying a restraining means directly through said at least one opening and through said hardened resin for slowing said step of inserting the liner.

5. The method of claim 4, wherein said restraining means comprises a hold-back cable.

6. The method of claim 1, wherein said step of attaching a securing member further comprises the step of:

attaching a capstan through said at least one opening and through said hardened resin; and securing a restraining means directly to said capstan for slowing said step of inserting the liner.

7. The method of claim 6, wherein said step of securing a restraining means comprises tying a hold-back cable to said capstan.

8. The method of claim 6, wherein said step of securing a restraining means comprises wrapping a hold-back cable around said capstan, whereby a first end of said holdback cable restrains insertion of the liner and a second end of said hold-back cable provides slack for permitting said insertion to proceed.

* * * * *

UNITED STATES PATENT AND TRADEMARK OFFICE
CERTIFICATE OF CORRECTION

PATENT NO : 6,103,046
DATED : August 15, 2000
INVENTOR(S) : Edward Peter Smith

It is certified that error appears in the above-identified patent and that said Letters Patent are hereby corrected as shown below:

Please delete the title and insert the following new title
--METHOD OF INSTALLATION OF A FLEXIBLE RESIN IMPREGNABLE TUBULAR PIPELINER USING AN INTEGRAL GROMMET--.

Signed and Sealed this

Seventeenth Day of April, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,103,046
DATED : August 15, 2000
INVENTOR(S) : Edward Peter Smith

It is certified that error appears in the above-identified patent and that said Letters Patent is hereby corrected as shown below:

Title page,
Item [54], Title, delete the title and insert the following new title:
-- METHOD OF INSTALLATION OF A FLEXIBLE RESIN IMPEGNABLE TUBULAR PIPELINER USING AN INTEGRAL GROMMET --.

Signed and Sealed this

Twelfth Day of October, 2004

JON W. DUDAS
*Director of the United States Patent and Trademark Office*